June 4, 1940.  C. GAUSMANN  2,202,813
ADJUSTABLE SCREW PROPELLER
Filed Nov. 6, 1936  3 Sheets-Sheet 2
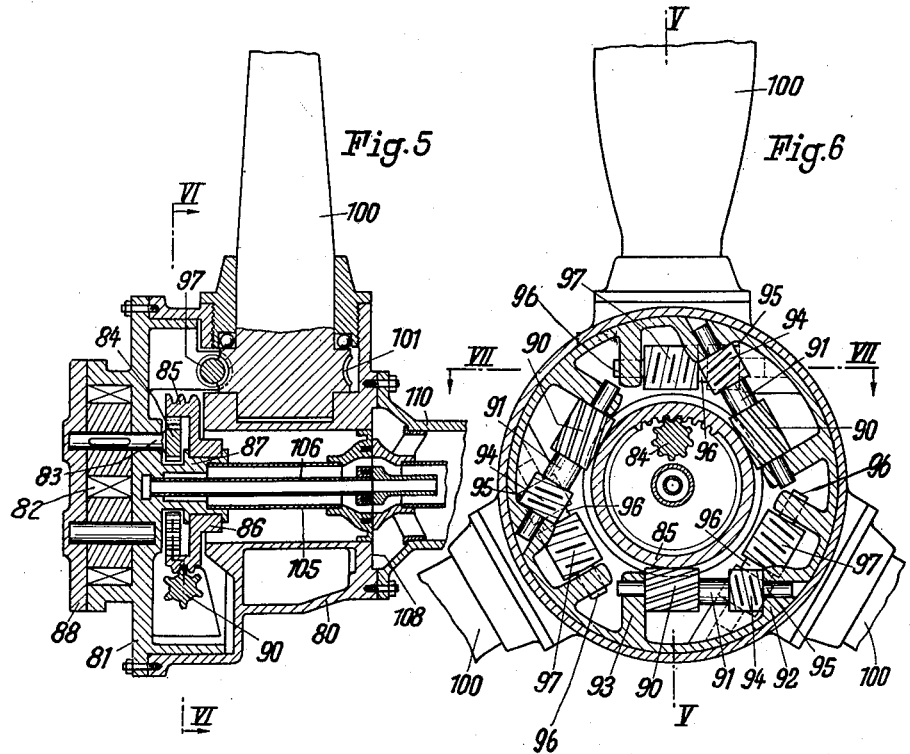
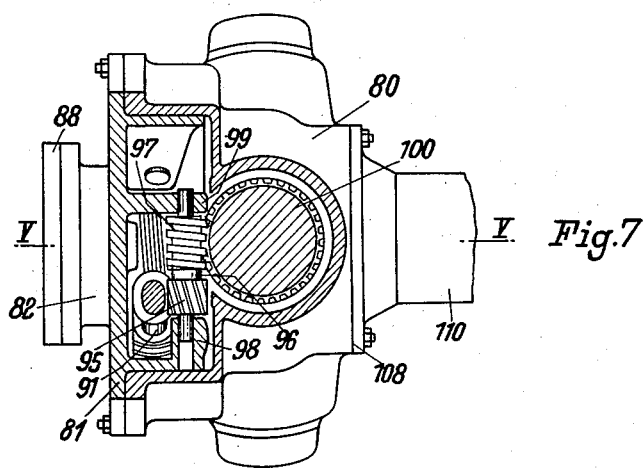
Inventor:
CARL GAUSMANN
BY *Karl Kirkpatrick*
ATTY.

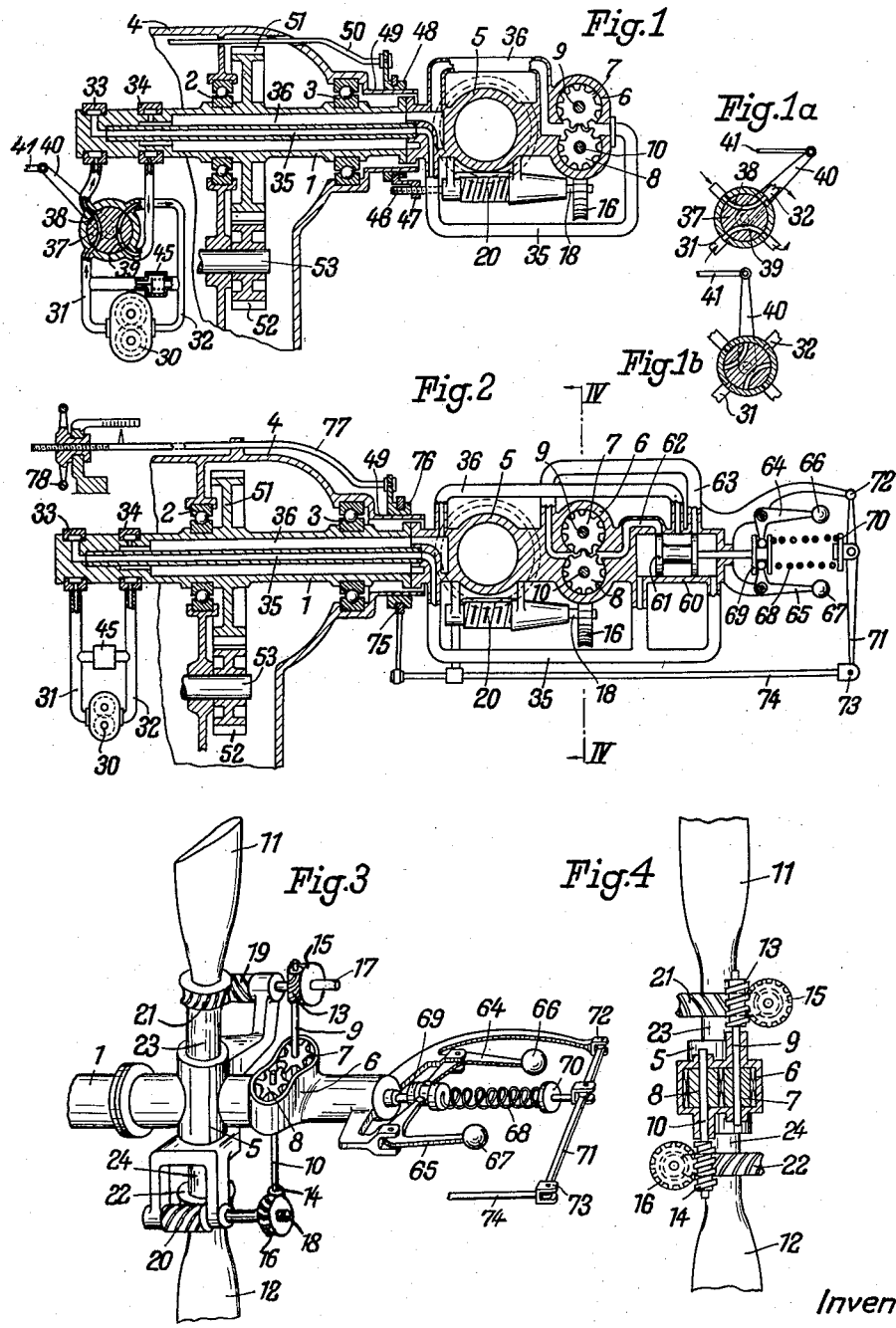

June 4, 1940.   C. GAUSMANN   2,202,813
ADJUSTABLE SCREW PROPELLER
Filed Nov. 6, 1936   3 Sheets-Sheet 3
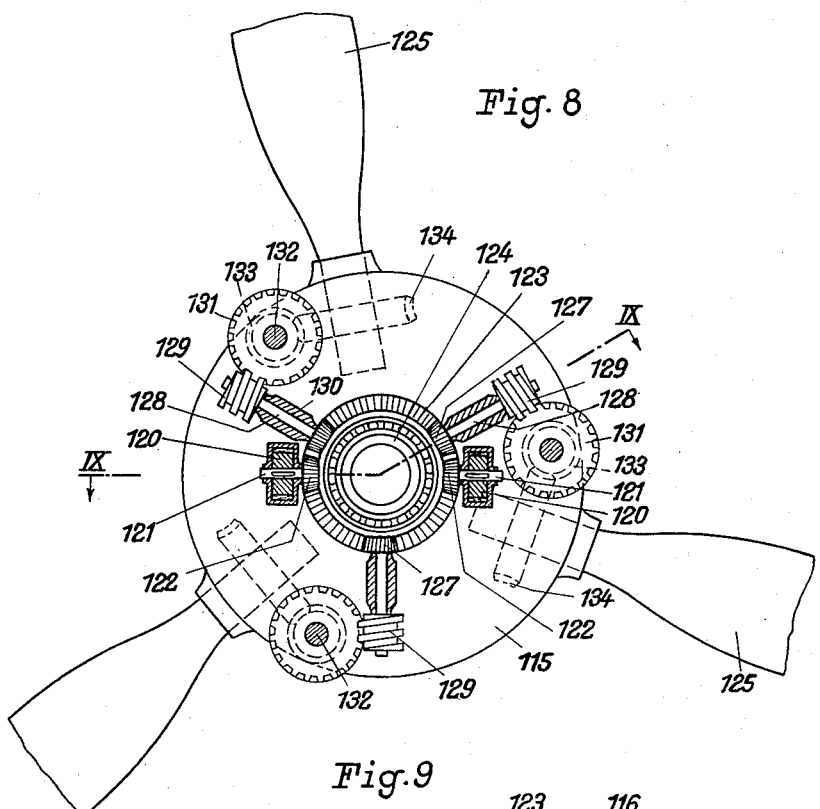
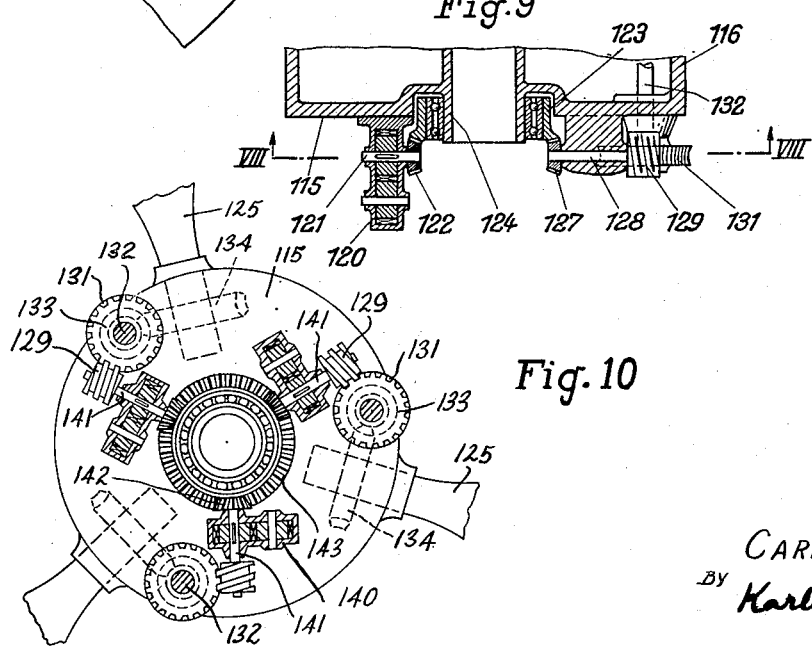
Inventor:
CARL GAUSMANN
BY Karl Michaelis
ATTY.

Patented June 4, 1940

2,202,813

UNITED STATES PATENT OFFICE

2,202,813

ADJUSTABLE SCREW PROPELLER

Carl Gausmann, Dessau, Germany, assignor to Junkers Flugzeug-und-Motorenwerke Aktiengesellschaft, Dessau, Germany Application November 6, 1936, Serial No. 109,421
In Germany November 11, 1935

8 Claims. (Cl. 170—163)

My invention relates to adjustable screw propellers and more especially to the means whereby the blades of screw propellers are adjusted during operation.

It has particular reference to hydraulic adjusting means, and it is an object of my invention to provide improved hydraulic mechanism for producing such adjustment.

Hitherto the adjustment of the propeller blades by hydraulic power transmission was as a rule effected with the aid of pistons arranged in cylinders for axial displacement. The movements of the pistons were transferred to the blades by means of piston rods, links and levers secured to the blades. Devices of this kind involve certain drawbacks. First of all the extent of power transmission between the piston and the blades is limited and therefore the piston motor effecting the transmission must be made relatively large, the transmission gear takes up much room, and it is therefore difficult for the designer to accommodate these parts on the hub of the propeller. Besides this, very large forces must be transmitted by the transmission members which must therefore be correspondingly strong and heavy. If levers are used in the power transmission, the angle through which the blades can be turned is rather limited.

In order to avoid these drawbacks and difficulties I use a hydraulic motor of the rotary type, for instance a gear motor for the adjustment of the blades by means of a fluid under pressure. Between the motor and the blades I arrange power transmission gears serving to change the rotary movement in the motor into an angular movement of the propeller blades.

Obviously an auxiliary motor of this kind can be operated with a high number of revolutions and can therefore be made comparatively small and light in weight. The transmission of the adjusting movement from the auxiliary motor to the propeller blades is preferably effected by means of a gearing containing only revolving parts which are readily produced and the form and arrangement of which offers a great many possibilities to the designer, so that the accommodation of such gearing will as a rule be a far simpler matter than the accommodation of a lever. With rotary gearing the angle of adjustment of the blades may be chosen according to requirements, and therefore it is possible for instance to extend the range of adjustment from a very large positive pitch (corresponding to the so-called sailing position of the blade) to a range of large negative pitch (the braking position).

In the drawings affixed to this specification and forming part thereof several embodiments of my invention are illustrated diagrammatically by way of example. In the drawings:

Fig. 1 is an axial sectional view of the propeller shaft, the hub and the auxiliary adjusting motor of a screw propeller, the blade-adjustment of which is controlled by hand, Figs. 1a and 1b illustrate two different positions of the control device for the pressure fluid, Fig. 2 is a view similar to that shown in Fig. 1 of a second modification in connection with means for the automatic adjustment of the blades under the control of a governor, Fig. 3 is a perspective view of the blade adjusting and controlling device shown in Fig. 2, while Fig. 4 is a cross sectional view of the auxiliary motor on the line IV—IV in Fig. 2, Figs. 5 to 7 illustrate the hub portion of an adjustable propeller with the adjusting gearing combined therewith, Fig. 5 is a sectional view on the line V—V in Fig. 6, Fig. 6, a sectional view on the line VI—VI in Fig. 5 and Fig. 7, a sectional view on the line VII—VII in Fig. 6, A fourth modification is illustrated in Figs. 8 and 9, Fig. 8 is an end view, partly in section, on line VIII—VIII in Fig. 9, of a propeller hub, while Fig. 9 is a cross sectional view on the line IX—IX in Fig. 8, Fig. 10 is a view, similar to Fig. 8, of a fifth modification.

Referring to the drawings and first to Figs. 1–4, 1 is the propeller shaft, 2 and 3 are bearings mounted on the body 4 of an engine or an aircraft and supporting the shaft 1. 5 is the hub of the air propeller, which is driven by a gear 51 fixed to the shaft 1 and meshing with the driving gear 52 which is here fixed to the shaft 53 of the motor. In the body of the propeller hub is mounted a hydraulic motor formed by a casing 6 and a pair of meshing gears 7 and 8, the spindles 9 and 10 of which extend at right angles to the axis of rotation of the propeller. Each of the spindles carries a worm 13 and 14 meshing with a worm wheel 15 and 16, respectively. The worm wheels drive by means of spindles 17 and 18 worms 19 and 20, respectively, which mesh with worm wheels 21 and 22 mounted on the shafts 23 and 24 of the propeller blades 11 and 12, respectively, which are mounted for rotation in the hub 5. By means of the gears 7 and 8 of the adjusting motor the two blades 11 and 12 of the propeller are so coupled with each other that they are always positively adjusted through the same angle.

The pressure fluid serving to drive the adjusting motor is forced by a pump 30, mounted upon some suitable point of the craft, towards the adjusting motor and back to the pump. To this end a pipe system 31, 32 leads from the intake and discharge of the pump 30, respectively, to the sleeves 33, 34 mounted on the propeller shaft 1, and from these sleeves conduits 35 and 36 extending through the hollow propeller shaft 1 lead to the adjusting motor 6, 7, 8.

In the embodiment shown in Fig. 1 these conduits 35, 36 are connected directly to the adjusting motor. In the stationary pipe system 31, 32 is inserted a control valve 37, which in the modifications illustrated in the drawings has the form of a 4-way cock with conduits 38 and 39, which enables the connections between the pump and the adjusting motor to be exchanged or cut off. The valve member carries a lever 40, which can be adjusted by the pilot by means of a rod 41. In the position shown in Fig. 1 of the valve member 37 the pressure side of the pump (pipe 31) communicates with sleeve 33 and conduit 35, while the suction side (pipe 32) communicates with the sleeve 34 and conduit 36. In this position of the parts, the adjusting motor rotates in a predetermined sense and correspondingly adjusts these propeller blades in a predetermined sense also.

In the position of the valve member 37 shown in Fig. 1a the pressure side 31 is connected through conduit 39 with sleeve 34, and the suction side 32 through conduit 38 with the sleeve 33. The pressure fluid thus drives the adjusting motor in the opposite sense, so that also the propeller blades are adjusted in the opposite sense.

Fig. 1b shows the valve member 37 in a middle position, in which the inlets and outlets are blocked, the adjusting motor being at a standstill and the propeller blades being not displaced. In order that in such a case the pump be enabled to continue operating, a safety valve 45 is inserted between the pressure and the suction pipes, which allows the liquid to pass from the pressure side to the suction side.

In order to enable the pilot to at any time ascertain the position of the propeller blades, an extension 46 is connected with one of the intermediate shafts 17, 18, this extension being formed with a screw thread meshing with the internal threading of a disk 47 which is mounted on a displaceable sleeve 48 for rotation. The sleeve is axially displaceable on a cylindrical extension 49 of the casing 4, and the extent of its displacement is rendered visible to the pilot by means of a rod 50.

In the modification illustrated in Figs. 2-4 the conduits 35, 36 extend into a valve case 60 in which is provided a slide 61 for controlling the conduits 62, 63 leading from the valve case to the connection of the adjusting motor. In accordance with the position of the slide either one or the other connection of the adjusting motor is supplied with pressure fluid and the motor driven in one or the other sense. Alternatively the conduits 62, 63 are cut out and the adjusting motor stopped. Adjustment of the slide is here brought about by a centrifugal governor taking part in the rotation of the propeller and consisting of angle levers 64, 65, flyweights 66, 67 and a regulating spring 68, which rests against the head 69 of the governor at one end, and against an abutment 70 at the other end. The governor tends to adjust the blades of the screw propeller so that the propeller always rotates with the same number of rotations determined by the tension of the governor spring. In order that this tension and with it the number of rotations of the propeller may be varied, the abutment 70 is mounted for displacement by being connected to a lever 71, one end 72 of which is supported in a fixed point of the hub, while the other end 73 is pivoted to a rod 74 fixed to a ring 75 surrounding a displaceable sleeve 76, which slides on the extension 49 of the engine casing and can be displaced by the pilot with the aid of a rod 77 adjustable by means of a hand wheel 78, such displacement also causing a displacement of the abutment 70.

In the modification illustrated in Figs. 5-7 the hub 80 of a screw propeller provided with three blades is closed at its front end by a cover 81, on which is mounted the adjusting motor 82, which here again is a gear motor. One spindle 83 of the motor extends inwardly across the cover 81, its inner end carrying a gear 84 meshing with the teeth of an internally toothed rim 85 which is mounted by means of its hub 86 on a projecting part 87 of the cover 81 in a position concentrically to the propeller shaft and which is formed on its circumference as a worm. With this worm mesh three worm wheels 90, the spindles 91 of which extend at right angles to lines through the propeller axis and are supported in bearings 92, 93 secured to the cover 81. On the spindles 91 are mounted worms 94 meshing with worm wheels 95 on spindles 96. These spindles, which also extend at right angles to lines through the propeller axis and are also supported in bearings 98, 99 on the cover 81, carry worms 97 meshing with the worm gear rims 101 formed on the shafts of the propeller blades 100.

The supply and exhaust of pressure fluid to and from the adjusting motor 82 occurs through tubes 105 and 106 extending concentrically to the axis of rotation of the propeller, the tube 106 extending through the tube 105. The tubes 105, 106 are interrupted at the joint 108 between the hub 80 and shaft 110 of the propeller, however the adjoining faces of the tubes 105, 106 and their extensions are applied against each other in a liquid-tight manner.

The supply and exhaust of the actuating liquid from and to the adjusting motor may be controlled, as above described, by hand or by means of some suitable governor. In the device here shown all movable parts of the adjusting mechanism, with the exception of the propeller blades, are mounted on the hub 81, which can easily be disengaged from the hub 80 together with the parts fixed to it, so that the gearing as a whole is then freely accessible. The putting-in place of the cover and gearing can be effected in an equally simple manner. The fact that the worms 97 meshing with the worm gear 101 on the shaft of the blades 100 extend at right angles to line through the axis of rotation of the propeller, is particularly favorable, since in consequence of this arrangement the worms 97 can easily be displaced in the direction of this axis of rotation relative to the worm gear on the blades. This arrangement is further advantageous for the reason that it greatly facilitates the combination of the adjusting motor with the power transmission gearing into a self-contained unit, which must be done with particular care. The fact that the adjusting motor is mounted on the outside of the cover 81 greatly facilitates the maintenance thereof, since the inner parts of the motor are easily accessible by simply disengaging the cover 88.

In the modification illustrated in Figs. 8 and 9 there are arranged on the end face 115 of the hub 116 of a three-blade propeller two adjusting motors 120 of the gear type, the motors being arranged eccentrically and on the same diameter and their shafts 121 driving, by means of a gear 122, the ring gear 123 mounted concentrically to the propeller axis, this ring gear being mounted for free rotation on a hollow journal 124 fixed in the hub and being connected by means of an intermediate gearing with each blade 125. Each intermediate gearing comprises a ring gear 127 meshing with the ring gear 123, the spindle 128 of the gear 127 being supported in a bearing 130 and carrying a worm 129 meshing with a worm gear 131 mounted on a spindle 132. The spindle further carries a worm 133 which meshes with worm rims 134 of the blades 125. The rotary movement of the rotary motors 120 is thus uniformly transmitted onto all the blades of the propeller. There may be provided more than two or only a single adjusting motor. In order that, in the latter case, the eccentrically arranged motor does not bring about any undesirable one-sided centrifugal forces, a compensating weight is preferably mounted on the end plate 115 diametrically opposite the motor.

The arrangement of adjusting motors here above described is particularly suitable in the case where it is desired that the central part of the propeller shall be left free for other purposes, for instance for the purpose of firing through the propeller shaft.

Fig. 10 illustrates an arrangement of adjusting motors in which a separate motor 140 is provided for each blade. The driving spindle 141 of each of these motors is connected with the blades 125 by means of a gearing (the parts of which are marked with the same numerals as in Fig. 8) in a similar manner as the spindles 128 in Fig. 8. In order that all the blades are adjusted uniformly, the adjusting motors are positively connected with each other. To this end each motor carries a gear 142 and the three gears mesh with a central ring gear 143 mounted for free rotation on the hollow journal 124. This gearing here merely serves for forcing all the adjusting motors to operate in synchronism, however not for the transmission of power from the motors to the blades, and it may therefore be designed much lighter in weight than in the cases illustrated in Figs. 8 and 9.

I wish it to be understood that I do not desire to be limited to the exact details of construction shown and described for obvious modifications will occur to a person skilled in the art.

I claim:

1. A variable pitch propeller having a plurality of blades rotatably mounted upon and with respect to a hollow propeller shaft comprising a fluid gear motor mounted upon said shaft adjacent said blades, means for operating said gear motor, a ring gear rotatably mounted upon and with respect to said shaft, means for driving said ring gear by said motor, and a plurality of worm and gear means, each worm and gear means rotatably connecting a blade to said ring gear.

2. In a propeller as in claim 1, said gear motor being mounted at an end of said shaft, said ring gear having teeth interiorly and exteriorly of the periphery thereof being mounted coaxially of said shaft adjacent said motor, and said driving and worm and gear means engaging oppositely located teeth on said ring gear.

3. A variable pitch propeller having a plurality of blades rotatably mounted upon and with respect to a hollow propeller shaft, a ring gear coaxial with and rotatable upon said shaft, a plurality of fluid gear motors supported by said shaft adjacent said ring gear, a worm and gear for each blade, and shaft and pinion means interconnecting said motors, ring gear, and worm and gear means for simultaneously and equally rotating said blades by said motors.

4. In a propeller as in claim 3, said motors being supported upon the outer periphery of said shaft and being engaged with said ring gear, and each worm and gear engaging said ring gear, whereby said ring gear synchronizes the rotation of said blades by said motors.

5. In a propeller as in claim 3, a separate motor for each blade, and said interconnecting means joining each motor to a worm and gear and to said ring gear, whereby said ring gear synchronizes the rotation of said blades by said motors.

6. In a variable pitch propeller having a plurality of blades rotatably mounted upon and with respect to a propeller shaft, blade pitch adjusting means comprising a fluid gear motor mounted upon said shaft adjacent said blades, a ring gear journalled upon said shaft, and gear means interconnecting said motor, blades, and ring gear for turning said blades.

7. In a variable pitch propeller having a plurality of blades rotatably mounted upon and with respect to a hollow propeller shaft, blade pitch adjusting means comprising a plurality of fluid gear motors supported upon the outer periphery of said shaft whereby the hollowed portion of said shaft is adapted to receive a gun barrel, and gear means interconnecting said motors to said blades.

8. In a variable pitch propeller having a plurality of blades rotatably mounted upon and with respect to a hollow propeller shaft, blade pitch adjusting means comprising a plurality of fluid gear motors supported upon the outer periphery of said shaft whereby the hollowed portion of said shaft is adapted to receive a gun barrel, means connecting said motors to said blades for turning said blades, and means for synchronizing the turning of said blades by said motors.

CARL GAUSMANN.